United States Patent [19]

Yonker, Jr.

[11] Patent Number: 4,987,288
[45] Date of Patent: Jan. 22, 1991

[54] GAS METAL ARC WELDING WIRE

[75] Inventor: Donald W. Yonker, Jr., Niles, Mich.

[73] Assignee: National-Standard Company, Niles, Mich.

[21] Appl. No.: 404,692

[22] Filed: Sep. 8, 1989

[51] Int. Cl.$^5$ .............................................. B23K 35/22
[52] U.S. Cl. ................................................. 219/146.1
[58] Field of Search ........ 219/146.1, 145.22, 137 WM

[56] References Cited

U.S. PATENT DOCUMENTS 3,030,496  4/1962  Cotter et al. ..................... 219/146.1
4,091,147  5/1978  Kanazawa et al. ............... 219/146.1

Primary Examiner—Clifford C. Shaw
Attorney, Agent, or Firm—Emrich & Dithmar

[57] ABSTRACT

An iron based filler wire is described for use in gas shielded arc welding and includes between about 0.05 to 0.09 weight percent carbon, 1.10 to 1.40 weight percent manganese, 0.70 to 1.00 weight percent silicon, 0.00 to 0.025 weight percent phosphorus, 0.00 to 0.225 weight percent sulfur and 0.0 to 0.3 weight percent copper. The obtained weldment produced in $CO_2$ shielding gas possesses an average Charpy V-notch impact value of at least 45 ft.-lbs. at $-20°$ F.

6 Claims, No Drawings

GAS METAL ARC WELDING WIRE

BACKGROUND OF THE INVENTION

The present invention relates generally to welding wires for use in gas metal arc welding of steels, and more particularly to a chemically balanced iron based welding wire which provides for increased ease of drawing the wire, improved welding productivity and improved weld deposit properties and appearance.

Two commonly utilized field welding processes are shielded metal arc which utilizes coated stick electrodes and gas metal arc which utilizes bare wires or filler wires. The present invention relates to a chemically balanced composition for the bare or filler wires containing carbon, manganese, silicon, with restricted and controlled trace amounts of such elements as phosphorus, sulfur and copper.

For at least the last twenty years, filler wires containing each of the above identified elements have been manufactured and offered for sale to the welding industry. One such filler wire, identified as ER 70S-2, is one example of such a low alloy filler wire which contains a low silicon content. Because the ER 70S-2 wires contain reduced amounts of silicon, such types of filler wires are not well suited for deoxidizing welds on oily or dirty steels unless special expensive additives (aluminum, zirconium or titanium) are added to the alloy and such wires do not optimize the weld bead contours when the appearance of the weld is important in the finished part.

Another low alloy filler wire is known as ER-70S-6 which possess improved welding characteristics such as good wetting characteristics, low spatter levels and good weld deoxidation. However, because the ER 70S-6 wires contain higher carbon and manganese ranges, the increased carbon and manganese contents result in difficulties in drawing the wire and require the additional step of patenting or heating the wire either before or during the drawing operations. Thus, such filler wires are expensive to manufacture and result in a more costly filler wire.

Finally, a European filler wire material, identified as BS2901 Code A-18, which is nearly chemically equivalent to the AWS classification ER 70S-6, contains a typical composition of 0.1 weight percent carbon, 1.5 weight percent manganese, 0.85 weight percent silicon, 0.015 weight percent sulfur and 0.015 weight percent phosphorus. Although such filler wires exhibit good wetting characteristics and low spatter levels, the higher carbon and manganese content cause difficulties during manufacturing the wire because of the additional step of patenting or heating the wire before or during the drawing process. Accordingly such wires are expensive to manufacture.

SUMMARY OF THE INVENTION

One object of the present invention is to provide a chemically balanced filler wire which results in increased ease of drawing and reduced cost of manufacture of the filler wire.

An object of the present invention is to obtain improved weld deposit properties such as low temperature impact strength while using inexpensive shielding gases.

Another object of the present invention is a chemically balanced filler wire for use in gas metal arc welding which provides improved welding productivity.

Still another object of the present invention is a chemically balanced filler wire material for use in gas metal arc welding which provides an improved weld deposit appearance.

A further object of the present invention is a chemically balanced filler wire material having reduced carbon and manganese content which permits a manufacturer to use conventional rod cooling practices to provide a ductile microstructure for wire drawing.

Still another object of the present invention is a chemically balanced filler wire material containing reduced carbon and manganese content which reduces the work hardening rate during the drawing operation.

Still a further object of the present invention is a chemically balanced filler wire material having a sufficient silicon level to maintain the weld deposit characteristics including deoxidation of the weld puddle and reduced surface tension of the molten metal during the welding operation.

Yet another object of the present invention is to obtain improved low temperature impact strength of the weld deposit with low cost $CO_2$ shielding gas.

Finally, still another object of the present invention is a balanced chemical filler wire having restricted and controlled trace amounts of certain elements, such as phosphorus, sulfur and copper, which reduce the potential for weld deposit hot or thermal cracking.

In one embodiment of the present invention, the chemically balanced iron based filler wire has particular application in $CO_2$ gas shielded arc welding applications. Although the present invention has particular applicability in $CO_2$ gas shielded arc welding, it is within the scope of the present invention that the novel filler wires may be used in other shielding gases, such as, argon-$CO_2$ mixtures, argon-$O_2$ mixtures or tri-mixed gases including argon, $CO_2$, helium or $O_2$. The novel filler wire is comprised of between about 0.05 to 0.09 weight percent carbon, 1.10 to 1.40 weight percent manganese, 0.70 to 1.00 weight percent silicon, 0.00 to 0.025 weight percent phosphorus, 0.00 to 0.025 weight percent sulfur and 0.00 to 0.30 weight percent copper. Unexpectedly the chemically balanced filler wire produces a weldment having an average Charpy V-notch impact property of 57.5 ft.-lbs. at −20° F. wherein the prior art AWS classification material ER 70S-2 produces an average Charpy V-notch impact property of 33.7 ft.-lbs., the prior art AWS classification material ER 70S-6 produces a Charpy V-notch impact value at −20° F. of 31.5 ft.-lbs. and the prior art filler A-18 material produces a Charpy V-notch impact property of 33.0 ft.-lbs. at −22° F.

The novel filler material in accordance with the present invention results in a filler wire containing reduced carbon and manganese contents which allows the steel manufacturer to use conventional rod cooling practices while still producing a ductile microstructure for wire drawing. This procedure reduces the work hardening rate of the material during the actual drawing operation and eliminates the need for patenting or heat treating the wire during the drawing operation. The resulting chemically balanced filler wire is less costly to manufacture than these prior art filler wires. Importantly, the lower carbon level in the chemically balanced filler wire reduces the hardness of the weld deposit thereby permitting an increase in the average silicon content for improved deoxidation. The restricted and controlled trace amounts of phosphorus, sulfur and copper levels reduce the potential for weld deposit hot cracking.

By permitting the utilization of relatively high silicon content in the chemically balanced filler material, enhanced welding characteristics are achieved because, it is believed, the silicon content deoxidizes the weld puddle and reduces the surface tension of the molten metal providing for a weld bead height to width ratio which is reduced. This minimizes the utilization of excess weld reinforcement, reduces the notch effect where the edge of the weld meets the parent steel, thereby improving fatigue properties and improves the appearance of the weld deposit. Finally, during the welding operation, the chemically balanced filler material in accordance with the present invention promotes improved bead contours at higher arc travel speeds and reduced heat inputs, and the splatter droplets formed during the welding process are reduced in number and size thereby substantially reducing post weld clean up time and the attendant cost thereof.

DESCRIPTION OF THE PREFERRED EMBODIMENTS

The chemically balanced iron based filler wire in accordance with the present invention has particular application for use in gas shielding arc welding applications. The filler wire contains between about 0.05 to 0.09 weight percent carbon, 1.10 to 1.40 weight percent manganese, 0.70 to 1.00 weight percent silicon, 0.00 to 0.025 weight percent phosphorus, 0.00 to 0.025 weight percent sulfur and 0.00 to 0.30 weight percent copper. The restricted and controlled amounts of phosphorus, sulfur and copper in the present invention are naturally occurring residuals from the normal steel making process. Such elements are normally considered detrimental to hot cracking and low temperature ductility and, accordingly, their concentration has been restricted below conventional compositions. Table I summarizes the specified chemical composition by weight percent for a chemically balanced filler wire identified as NS104 in accordance with the present invention and lists specified AWS classifications for two prior art filler wires, namely ER 70S-2 ER 70S-6 and one British Standard classification, A-18. The ER 70S-2 wire includes 0.05 to 0.15 weight percent titanium and aluminum and 0.02 to 0.12 weight percent zirconium.

TABLE I

| Classification | Specified Chemical Composition Weight Percent | | | | | |
|---|---|---|---|---|---|---|
| | C | Mn | Si | P | S | Cu |
| ER 70S-3 | 0.00 | 0.90 | 0.40 | 0.00 | 0.00 | 0.00 |
| (AWS classification) | to | to | to | to | to | to |
| | 0.07 | 1.40 | 0.70 | 0.025 | 0.035 | 0.50 |
| ER 70S-6 | 0.07 | 1.40 | 0.80 | 0.00 | 0.00 | 0.00 |
| (AWS classification) | to | to | to | to | to | to |
| | 0.15 | 1.85 | 1.15 | 0.025 | 0.035 | 0.50 |
| A-18 | 0.00 | 0.90 | 0.70 | 0.00 | 0.00 | 0.00 |
| (BS classification) | to | to | to | to | to | to |
| | 0.12 | 1.60 | 1.20 | 0.04 | 0.04 | 0.4 |
| NS-104 | 0.05 | 1.10 | 0.70 | 0.00 | 0.00 | 0.00 |
| (Present Invention) | to | to | to | to | to | to |
| | 0.09 | 1.40 | 1.00 | 0.025 | 0.025 | 0.3 |

The filler material in accordance with the present invention provides a filler wire containing a reduced carbon and manganese content which permits the steel manufacturer to utilize conventional rod cooling practices while producing a ductile microstructure for wire drawing. The restricted chemistry of the NS-104 filler material reduces the work hardening rate during the actual drawing operation of the filler material and eliminates the need for patenting or heating the wire during the drawing operation. For example, in drawing the ER 70S-6 filler material, it is necessary to anneal or patent the wire during the drawing operation before properly drawing to the resultant filler wire size. This additional step of annealing or patenting the wire during the drawing operation is expensive and results in a higher cost filler material. The elimination of the annealing or patenting step during the drawing operation in accordance with the present invention permits a steel manufacturer to utilize conventional rod cooling practices while still producing a ductile microstructure for wire drawing.

Additionally, the lower carbon level in the chemically balanced iron based filler wire NS-104 reduces the hardness of the resultant weld deposit thereby permitting an increase in the average silicon content for improved deoxidation during the welding process. Additionally, as set forth above, the lower phosphorus, sulfur and copper levels in the NS-104 filler material reduces the potential for weld deposit hot cracking during the welding operations.

Finally, the increased silicon levels may be maintained in the chemically balanced NS-104 filler material to enhance welding characteristics. The higher silicon content deoxidizes the weld puddle and reduces the surface tension of the molten metal providing a reduced weld bead height to width ratio. This reduction minimizes excess weld reinforcement, reduces the notch effect where the edge of the weld meets the parent steel thereby improving fatigue properties and improving the appearance of the weld deposit. The reduced surface tension of the liquid weld deposit promotes improved bead contours at higher arc travel speeds with reduced heat input. Also, the splatter droplets formed during the welding process are substantially reduced in number and size thereby substantially reducing post weld clean-up time with its attendant cost.

To determine the fracture-toughness of the chemically balanced filler wire in accordance with the present invention, Charpy V-notch impact tests were conducted on the NS-104 weld deposits as well as the prior art ER 70S-2 and ER 70S-6 weld deposits and with the published Charpy V-notch impact values of the A-18 classification filler material. Charpy V-notch impact tests were conducted in accordance with AWS B4.0 on test specimens welded in accordance with AWS A5.18, as is well known in the art. The Charpy V-notch impact test was run on a weldment having a length of 2.165±0.1 inches and having a width of 0.394 inches with a V-notch which was 0.079 inches deep having a 45°±1° included angle which terminated at 0.01 inch±0.001 inch radius apex. The test weldment specimens were prepared using a standard 0.045 inch NS-104 filler wire with a shielding gas of 100% carbon dioxide $CO_2$. The electrode feed rate was 450 inches per minute±5% at a nominal arc voltage of 27-31 volts. The resultant current was between 260 and 290 amps, with the tip to work distance at ¾ inches±⅛ inch and a travel speed of 13 inches±1 inch per minute. Each weldment yielded five test samples and measurements, with the lowest value and the highest value being disregarded with the remaining three values being given as an average value in accordance with AWS B4.0. The interpass temperature was 300° F.±25° F.

Table II summarizes the measured Charpy V-notch impacts at −20° F. and the published value for the conventional prior art filler material A-18 and the remaining materials were tested in accordance with the above identified procedures.

TABLE II

| AWS & British Classification | Shielding Gas | Average Measured Charpy Impact at −20° F. (ft.-lb.) |
| --- | --- | --- |
| ER 70S-2 | $CO_2$ (100%) | 33.7 |
| ER 70S-6 | $CO_2$ (100%) | 31.5 |
| A-18 | $CO_2$ (100%) | 33.0 (at −22° F.) |
| NS-104 (Present Invention) | $CO_2$ (100%) | 57.5 |

The typical composition of the A-18 filler material was 0.1 weight percent carbon, 1.5 weight percent manganese and 0.85 weight percent silicon, the typical composition of the ER 70S-6 material was 0.11 weight percent carbon, 1.71 weight percent manganese and 1.02 weight percent silicon and the typical composition of ER 70S-3 material was 0.05 weight percent carbon, 1.14 weight percent manganese and 0.51 weight percent silicon, and the actual composition of the NS-104 filler material was 0.08 weight percent carbon, 1.22 weight percent manganese and 0.94 weight percent silicon.

The unexpectedly high measured Charpy V-notch impact values for the present invention compared with the conventional prior art filler materials indicates significant improved low temperature impact energy absorption and indicates a lower ductile-brittle transition temperature. The disclosed range in the balanced chemical composition of the present invention yields a range in Charpy v-notch impact values of a minimum average of about 45 ft.-lbs. at −20° F., when $CO_2$ is used as the shielding gas. It is believed that the range of the Charpy V-notch impact values would be higher than this indicated average when inert shielding gases are employed.

Table III shows further indications of superior ductility at −20° F. of the present invention with regard to the percent ductile shear in the fracture surfaces and increased lateral expansion of the specimen when the present invention is compared to the prior art ER 70S-6 filler material.

TABLE III

| Material | Percent Ductile Shear | Mils Lateral Expansion |
| --- | --- | --- |
| ER 70S-6 | 22.1 | 27.3 |
| NS-104 (Present Invention) | 35.0 | 47.2 |

While one specific embodiment of the invention has been illustrated and described in detail herein, it is apparent that variations and modifications may be made which would be obvious to one of ordinary skill in the art without departing from the spirit of the invention as described in the appended claims.

What is claimed is:

1. An iron based filler wire for use in gas shielded arc welding to provide a weldment, said filler wire being substantially free of rare earth metals including between about 0.05 to 0.09 weight percent carbon, 1.10 to 1.40 weight percent manganese, 0.70 to 1.00 weight percent silicon, 0.00 to 0.025 weight percent phosphorus, 0.00 to 0.025 weight percent sulfur and 0.0 to 0.3 weight percent copper, with said weldment produced in $CO_2$ shielding gas, possessing an average Charpy V-notch impact of at least 45 ft.-lbs. at −20° F.

2. The filler wire in accordance with claim 1 wherein said weldment produced in gas mixtures containing as a major component an inert gas, possessing an average Charpy V-notch impact of at least 50 ft.-lbs. at −20° F.

3. The filler wire in accordance with claim 1 wherein the mean average Charpy V-notch impact is at least 50 ft.-lbs. at −20° F. in $CO_2$.

4. An iron based filler wire for use in gas shielded arc welding to provide a weldment, said filler wire consisting of between about 0.05 to 0.09 weight percent carbon, 1.10 to 1.40 weight percent manganese, 0.70 to 1.00 weight percent silicon, 0.00 to 0.25 weight percent phosphorus, 0.00 to 0.025 weight percent sulfur and 0.0 to 0.3 weight percent copper, with said weldment produced in $CO_2$ shielding gas, possessing an average Charpy V-notch impact of at least 45 ft.-lbs. at −20° F.

5. The filler wire in accordance with claim 4 wherein said weldment produced in gas mixtures containing as a major component an inert gas, possessing an average Charpy V-notch impact of at least 50 ft.-lbs. at −20° F.

6. The filler wire in accordance with claim 5 wherein the mean average Charpy V-notch impact is at least 50 ft.-lbs. at −20° F. in $CO_2$.

* * * * *